April 6, 1926.

A. R. MEISSNER ET AL 1,579,880

SHADOW PROJECTING APPARATUS

Filed July 30, 1924.    4 Sheets-Sheet 1

April 6, 1926. 1,579,880
A. R. MEISSNER ET AL
SHADOW PROJECTING APPARATUS
Filed July 30, 1924 4 Sheets-Sheet 2
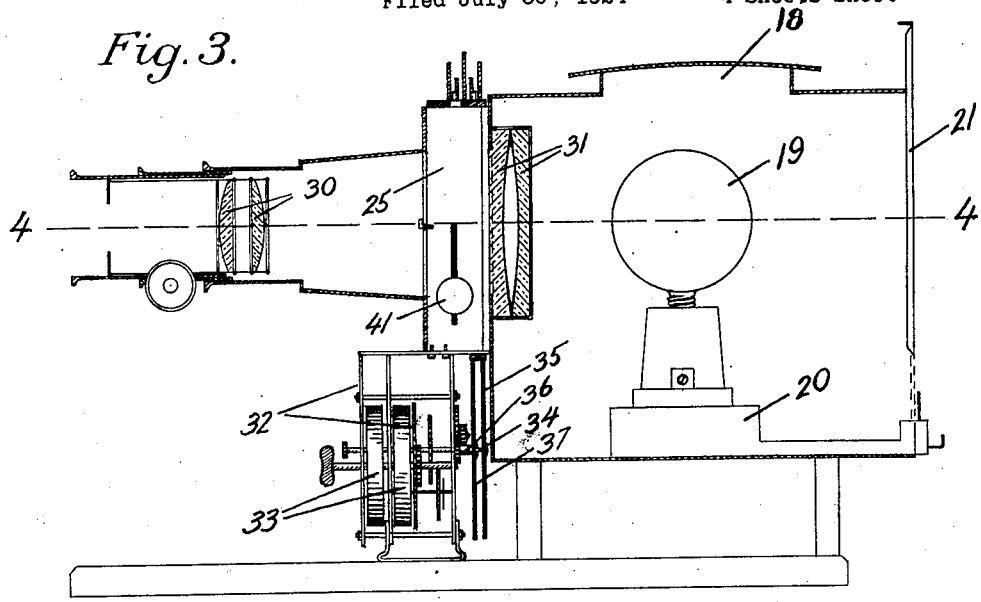
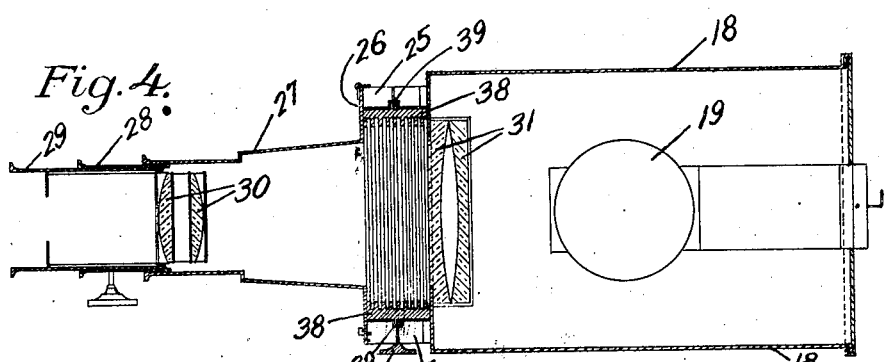
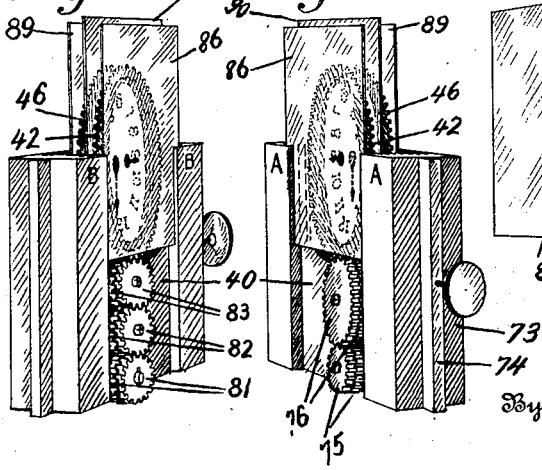
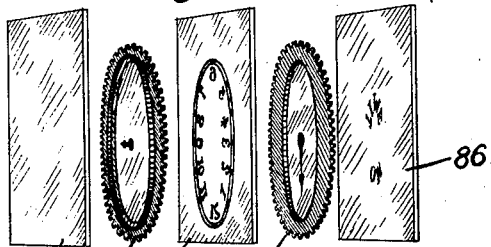

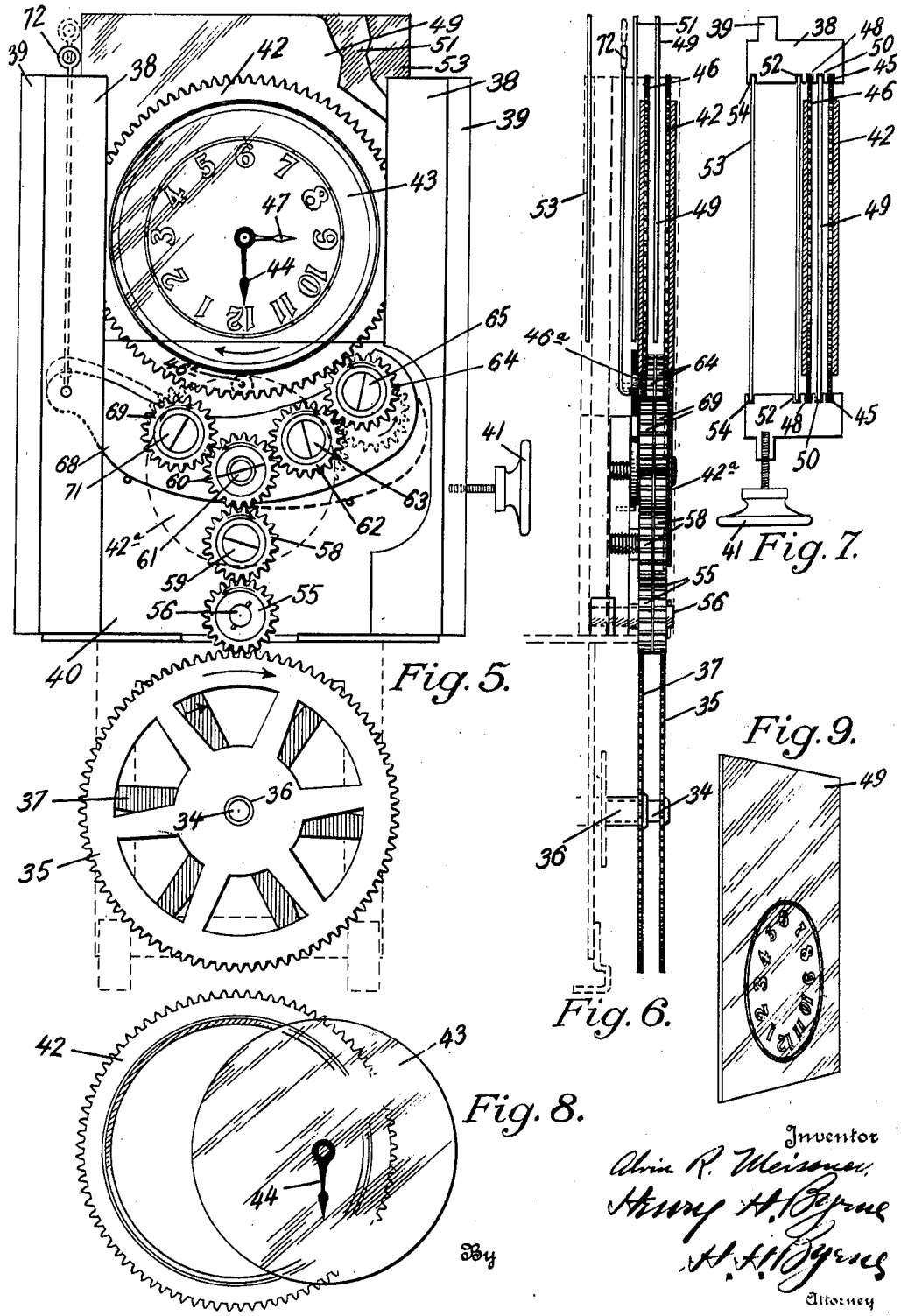

April 6, 1926. 1,579,880
A. R. MEISSNER ET AL
SHADOW PROJECTING APPARATUS
Filed July 30, 1924 4 Sheets-Sheet 4
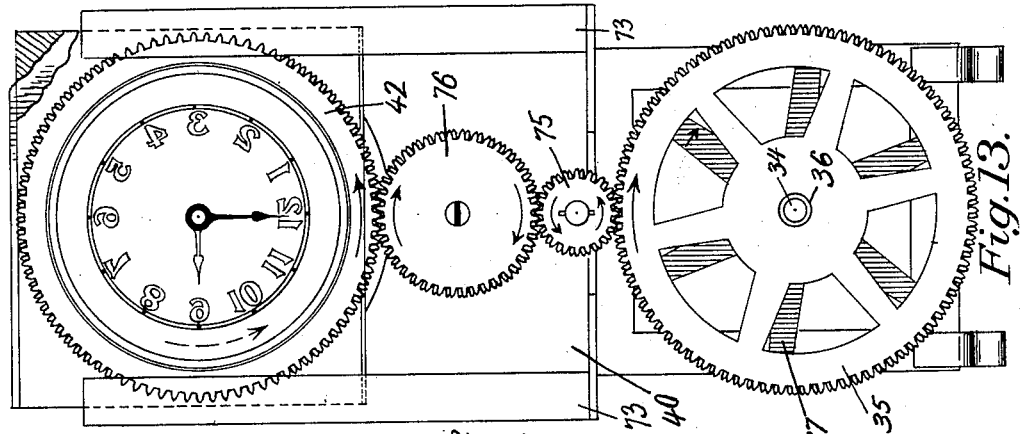
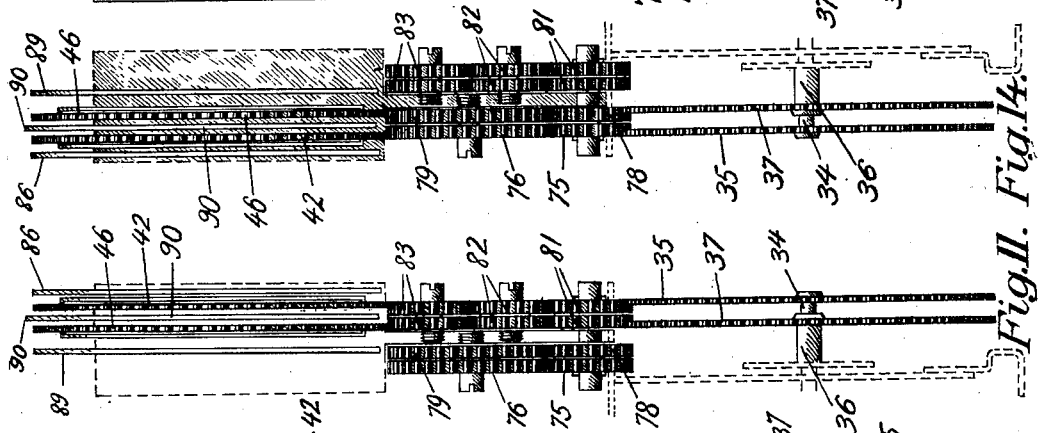
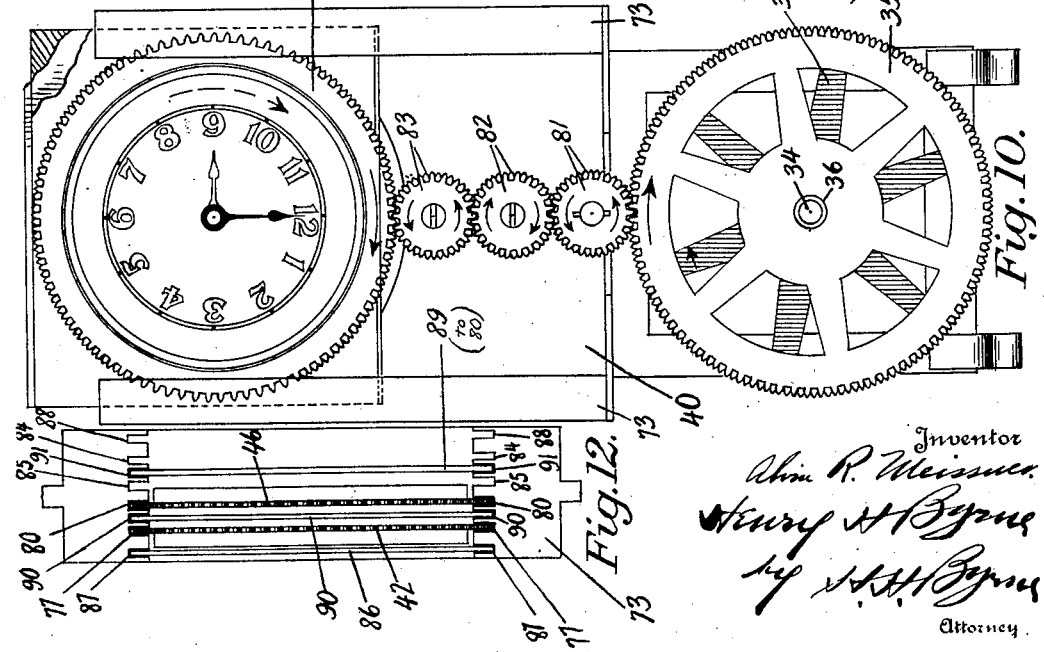

Patented Apr. 6, 1926.

1,579,880

UNITED STATES PATENT OFFICE.

ALVIN R. MEISSNER, OF DETROIT, MICHIGAN, AND HENRY H. BYRNE, OF WASHINGTON, DISTRICT OF COLUMBIA.

SHADOW-PROJECTING APPARATUS.

Application filed July 30, 1924. Serial No. 729,151.

*To all whom it may concern:*

Be it known that we, ALVIN R. MEISSNER and HENRY H. BYRNE, citizens of the United States, residing at Detroit, in the county of Wayne and State of Michigan, and Washington, District of Columbia, respectively, have invented certain new and useful Improvements in Shadow-Projecting Apparatus, of which the following is a specification.

The present invention relates to apparatus for projecting shadows of indicated time or other indicia and consists in the combinations and arrangements of elements hereinafter described and particularly set forth in the accompanying claims.

The purpose of the invention is to provide an illuminated time telling apparatus for outdoor or inside display which will by shadow effect show an enlarged clock image on a distant screen or other surface, which is simple and of inexpensive construction, one which can be kept in continuous use for but a fraction of the cost required for the nearest similar advertising under present conditions, and which will in all respects correspond with the time piece from which it is projected.

Another purpose of the invention is to provide means additional to the clock mechanism designed to supplement the projected shadow with appropriate advertising matter or other display all to show in harmonious union on the screen, through the same instrumentality and from one source and control.

The apparatus is primarily designed to be used for showing time, with appropriate advertising, by shadowing on surfaces usually darkened along public highways, and which surfaces or screens are in no way marred or in any manner marked to show at day time. Thus the shadow clock and its accompanying advertising may be displayed at night time on a house or other building quite regardless of the windows and doors thereon, likewise on the street, sidewalk, or roadway, on a lawn, house-top, or water surface. And means are provided for conveniently regulating the size of the projected circle commensurate with the location and dimensions of the surface forming the screen.

Figure 1:
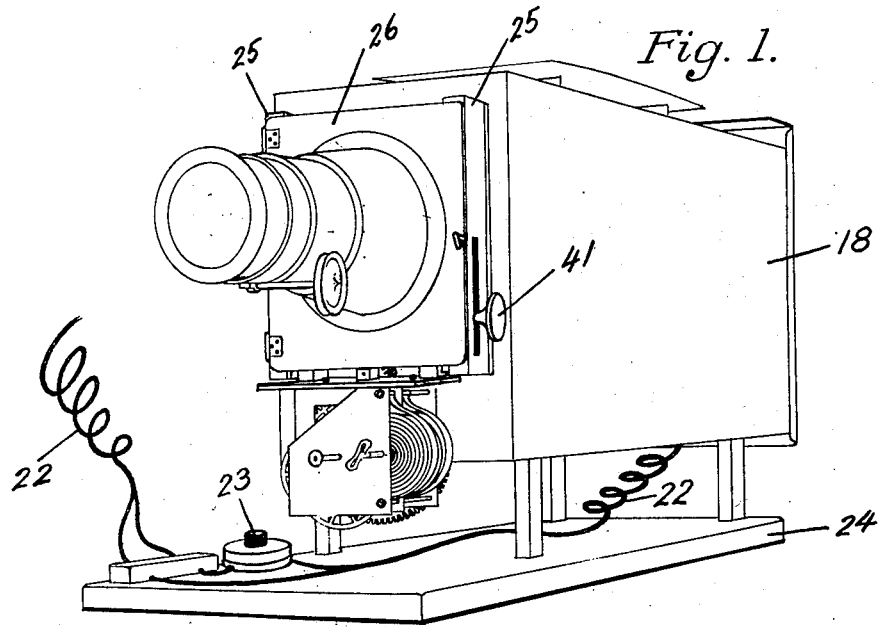

The invention is shown by way of illustration in the accompanying drawings wherein:

Figure 1 is a perspective view of the apparatus complete.

Figure 2:
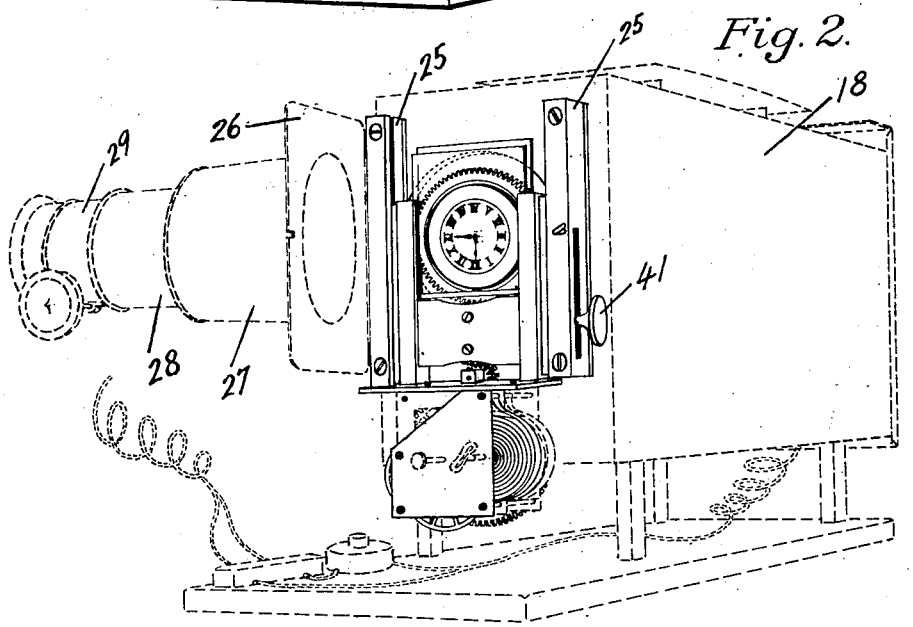

Figure 2 a similar view showing the features of the invention in full lines and the accompanying apparatus in broken lines.

Figure 3 a longitudinal sectional view of the apparatus.

Figure 4 a horizontal sectional view thereof taken on the line 4—4 of Figure 3.

Figure 5 an enlarged elevational view of the dials and associated mechanism.

Figure 6 a side elevational view thereof.

Figure 7 a top plan view of the same.

Figure 8 a detailed view of one of the movable dials with parts dis-assembled.

Figure 9 a detailed perspective view of the fixed dial.

Figure 10 a front elevational view, corresponding to Figure 5, of a modified construction.

Figure 11 a side elevational view thereof.

Figure 12 a top plan view of the same.

Figure 13 an elevational view of the obverse side of the mechanism shown in Figure 10.

Figure 14 a side elevational view thereof.

Figure 15 a perspective view of the modified construction.

Figure 16 a similar view taken from a different angle, and

Figure 17 a dis-assembled view of the fixed and movable dials and their immediately associated parts.

Referring to the construction of apparatus in further detail, and wherein like reference numerals indicate corresponding parts in the different views shown, the same consists of a suitable casing 18 constructed of sheet metal and of a size convenient for handling and transportation. A stereopticon lamp 19 (e. g., 250—400W.) is suitably mounted centrally within said casing on a movable base portion 20 adapted for proper adjustment and accessible through the slidable door 21 at the rear as with apparatus of this type. The usual conductor wires 22 connect with the lamp 19 and have a conveniently located switch 23.

Suitably secured to the front wall of the casing 18 are two upright and parallel side pieces 25, to one of which is hinged the door 26 having mounted thereon an ordinary telescope including a fixed portion 27 and movable portions 28 and 29. The usual pair of lenses 30 are located within the telescope and an ordinary condenser 31 is secured within the casing intermediate the telescope and the lamp as shown (see Figures 3 and 4).

That part of the apparatus above described in detail is of ordinary construction and may be purchased in the open market. No claim to such apparatus per se is made herein.

A suitable clock mechanism 32 having a dual spring motor 33 is secured just below the telescope and in front of the casing (see Figures 1, 2 and 3), and except for the double spring 33 said clock mechanism is of the ordinary type. The arbors 34 and 36 have mounted thereon two relatively large pinions 35 and 37 respectively connected to gear with and turn the two movable dials carrying the hour and minute hands of the time indicating mechanism.

The time indicating and projecting portion of the apparatus consists of a suitable supporting frame having side portions 38, formed with tenons 39 and a connecting cross piece 40 (see Figures 5 and 7). The tenon portions 39 fit within suitable mortices formed in the two side members 25 and a set screw 41 serves for holding the parts in any adjusted position.

The minute indicator of the system consists of a toothed ring or ring pinion 42 having inserted therein the dial crystal 43 on which is plainly shown by painting or otherwise suitably marking a clock hand or pointer 44. Said ring pinion 42 is set to work within the parallel pair of grooves or slots 45 formed within the frame members 38 (see Figure 7). A second ring pinion 46 having a crystal dial suitably marked with an hour hand 47, works within the two slots 48 formed in the side members 38 after the manner of the minute hand dial. A glass plate 49 suitably marked with a clock face dial removably fits within the two slots 50 between the dials carrying the minute and hour hands 42 and 46 respectively (see Figure 9) and co-operates therewith to form the complete clock image to be projected by shadow effect.

A slide 51 of suitable transparent material removably fits within the two slots 52 on the side members 38 immediately in front of the hour dial 46 (see Figures 6 and 7), is adapted to have marked thereon any advertising matter desired to be projected on the screen; and a transparent and colored plate 53 slidably fits with the grooves 54 to the end of giving any selected color to the clock and sign projected.

The motion transmitting means between the clock pinions 35 and 37 and the movable dials (see Figures 5 and 6) consists of two similar pinions 55 journalled on the stub-shaft 56 and meshing with two pinions 58 on the stub-shaft 59 and said pinions 58 turn the two pinions 60 on the stub-shaft 61. The pinions 60 gear with pinions 62 on shaft 63 and through pinions 64 or shaft 65 connect to drive the two ring pinions 42 and 46 carrying the minute and hour indicating hands of the clock.

One contemplated use of the invention is by showing on a fabric screen, e. g., the drawn shade of a window, in which event the projected shadow can be seen on either side thereof. Therefore, to the end that the hour and minute indicating hands of the clock may be operated in a clockwise or anti-clockwise direction, according to which side of the screen the projected shadow is to be read, a portion of the gear train is journalled on an arm 68 fulcrumed to balance on the stub shaft 61 in such a way that when in one position the last pair of gear wheels 64 mesh with the two ring pinions 42 and 46 as shown in Figure 6, but when moved to its other position said ring pinions are connected to be driven through the two pinions 69 on the stub-shaft 61. Or stated in another way, the first train of gears includes three pairs of pinions (i. e., 60, 62, and 64) or one gear more than the second gear train (60 and 69) with the natural result that the ring gears 42 and 46 will in one instance be driven in one direction and in the other instance the reverse direction. This selection of direction may be conveniently made through the shift rod 72 for rocking the balanced arm 68 (see Figure 5).

The modified construction of apparatus described in Figures 10 to 17 inclusive is in all essentials and manner of operation the same as above explained. It differs therefrom in that there are two independent and quite distinct trains of gear wheels or pinions for turning the hour and minute dials of the clock either clockwise or anti-clockwise.

In the modified form the two large pinions 35 and 37 of the clock mechanism per se are connected to move the two ring pinions 42 and 46 through the pinion train 81, 82 and 83. (See Figures 10 and 11.) And for moving said ring pinions in the reverse direction the transmission is from clock pinions 35 and 37 through the two pairs of pinions 75 and 76 as shown. For the reasons given above it is necessary to change the position of the movable dials 42 and 46 accordingly as they are to be driven for moving clockwise or counter clockwise. In one instance said ring pinions work within the two pairs of slots 77 and 80 formed in the frame 73 as shown in Figure 12 and at such time the fixed dial 90 having the clock face is located between said ring pinions as shown. With this relation of the time indicating dials the advertising slide 86 and color plate 89 fit within grooves 87 and 91 respectively.

In their changed position, i. e., when the time indicating mechanism is to be reversed and driven by the gear train 75 and 76 the two ring pinions 42 and 46 work within the slots 84 and 85. Also, the advertising plate 86 fits within grooves 88 and the color slide 89 is transferred to grooves 80.

It is to be understood that we do not desire to limit ourselves to the precise details of construction and arrangement herein set forth, as it is obvious that various modifications may be made therein without departing from the essential features of the invention.

It should be particularly noted that the entire mechanism is contained within a removable frame as a unitary structure. In this frame are mounted the stationary and revolving dials as well as the transparent advertising and colored plates together with the necessary gears and clock work for turning the dials. It will thus be evident that all the parts forming the subject matter of the present invention can be removed for shipment, storage, general handling and repairing. This is of great importance as the operator does not need to carry the bulky casing with the telescope.

Another feature of the invention consists in the placing of the frame between the telescope and the lamp casing immediately in front of the optical condenser 31 and that the dials and plates as well as all the gears in the frame are very compactly arranged so that the frame after removal can conveniently be put in the pocket of the operator.

The manner of mounting the telescope on the casing by means of side hinges provides great accessibility to all the working parts when the telescope is swung open. It will also be noted that the advertising or display matter may constantly be changed by replacing the frame in the casing by another frame carrying different advertising matter.

The device is equally effective for outdoor as for in-door advertising and on either side of a transparent screen. The sign or advertisement can be thrown in any direction, upon the ceiling of a building, or down on the floor, or on the wall thereof, or on a fence, pavement, roadway, or water surface.

What is claimed as new is:

1. In an apparatus for producing changeable illuminated signs, the combination of a suitably slotted frame, driven pinions journalled in said frame, a rocking arm pivoted in the frame, idler gears journalled in said arm and meshing with said driven pinions, concentric ring pinions fitting within slots provided in said frame and adapted to gear with said idler gears, said ring pinions being selectively operable in two directions through the cooperation of said arm and said idler gears, dials in said ring pinions having shadow effecting means, a source of light, and a motor in gear with said driven pinions.

2. In an apparatus for projecting changeable illuminated signs the combination with a casing having a front opening, an optical condenser at said opening, a lamp back of the condenser and a telescope attached to the casing at said opening; of a frame detachably secured immediately in front of the condenser and back of the telescope, driven pinions journalled in said frame, concentric ring gears fitting within slots provided in said frame and meshing with said pinions, said ring gears being interchangeably mounted in the slotted frame whereby to operate in two directions, dials in said ring gears having shadow effecting means, and a motor for said driven pinions.

3. In an apparatus for projecting changeable illuminated signs the combination with the casing having a front opening, an optical condenser at said opening, a lamp back of the condenser and a telescope hinged to the casing at said opening; of a frame detachably secured immediately in front of the condenser and back of the telescope, driven pinions journalled in said frame, concentric ring gears fitting within slots provided in said frame and meshing with said pinions, said ring gears being interchangeably mounted in the slotted frame whereby to operate in two directions, dials in said ring gears having shadow effecting means, and a motor for said driven pinions, the swinging of the telescope on its hinge permitting free access to all operating parts in the frame.

4. In an apparatus for projecting changeable illuminated signs the combination with a casing having a front opening, an optical condenser at said opening, a lamp back of the condenser and a telescope attached to the casing at said opening; of a frame detachably secured immediately in front of the condenser and back of the telescope, driven pinions journalled in said frame, concentric ring gears fitting within slots provided in said frame and meshing with said pinions, said ring gears being interchangeably mounted in the slotted frame whereby to operate in two directions, dials in said ring gears having shadow effecting means, a stationary dial cooperable with said movable dials to project a shadow-clock, and a motor for said driven pinions.

5. In an apparatus for projecting changeable illuminated signs the combination with a casing having a front opening, an optical condenser at said opening, a lamp back of the condenser and a telescope attached to the casing at said opening; of a frame detachably secured immediately in front of the condenser and back of the telescope, driven pinions journalled in said frame, concentric ring gears fitting within slots provided in said frame and meshing with said pinions, said ring gears being interchangeably mounted in the slotted frame whereby to operate in two directions, dials in said ring gears having shadow effecting means, a stationary dial cooperable with said movable dials to project a shadow-clock, transparent plates suitably marked and removably mounted in said frame in front of the dials, and a motor for said driven pinions.

6. In an apparatus for projecting changeable illuminated signs the combination with a casing having a front opening, an optical condenser at said opening, a lamp back of the condenser and a telescope attached to the casing at said opening; of a frame detachably secured immediately in front of the condenser and back of the telescope, driven pinions journalled in said frame, concentric ring gears fitting within slots provided in said frame and meshing with said pinions, said ring gears being interchangeably mounted in the slotted frame whereby to operate in two directions, dials in said ring gears having shadow effecting means, a stationary dial cooperable with said movable dials to project a shadow-clock, transparent plates suitably marked and removably mounted in said frame in front of the dials, the transparent plate directly in front of the foremost of the dials containing advertising matter, and a motor for said driven pinions.

7. In an apparatus for projecting changeable illuminated signs the combination with a casing having a front opening, an optical condenser at said opening, a lamp back of the condenser and a telescope attached to the casing at said opening; of a frame detachably secured immediately in front of the condenser and back of the telescope, driven pinions journalled in said frame, concentric ring gears fitting within slots provided in said frame and meshing with said pinions, said ring gears being interchangeably mounted in the slotted frame whereby to operate in two directions, dials in said ring gears having shadow effecting means, a stationary dial cooperable with said movable dials to project a shadow-clock, transparent plates suitably marked and removably mounted in said frame in front of the dials, the transparent plate directly in front of the foremost of the dials containing advertising matter, and the other plate being suitably colored, and a motor for said driven pinions.

8. A projecting apparatus comprising a casing, a telescope, a detachable device located intermediate the casing and the telescope, said device including a frame, a plurality of stationary and revoluble dials mounted in said frame, a clock work carried by the frame and geared to said revoluble dials and means for securing the device on the casing; said device, dials, and the clock work constituting a unitary removable structure.

9. A projecting apparatus comprising a casing having an aperture, a telescope, hinge connection for the telescope on the casing permitting the telescope to move clear of the casing aperture, a device slidably mounted intermediate the casing and the telescope over said aperture, said device including a frame and a clock work carried by the frame; a plurality of stationary and revoluble dials mounted in said frame, said clock work being geared to said revoluble dials mounted on the device and means for securing the device on the casing; said device, dials and the clock work constituting a detachable unitary structure.

10. A projecting apparatus comprising a casing, a telescope mounted to move clear of the casing, a device removably mounted intermediate the casing and the telescope, said device including a frame having tenons, means engaging said tenons for securing the device on the slotted guide-ways formed in said frame; dials having toothed perimeters removably fitting in said guide-ways, and a motor, carried by the frame and having a shaft with pinions on which said dials are mounted; said device, and the motor constituting a unitary removable structure.

In witness whereof, we have hereunto set our hands at Washington, D. C., this 28th day of July, A. D. nineteen hundred and twenty-four.

ALVIN R. MEISSNER.
HENRY H. BYRNE.